Sept. 26, 1944. G. W. RAPPLEYEA 2,358,777
METHOD AND MEANS FOR OBLIQUE AERIAL PHOTOGRAPHIC MAPPING
Filed Jan. 6, 1943 3 Sheets-Sheet 1

G. W. Rappleyea

Sept. 26, 1944.  G. W. RAPPLEYEA  2,358,777
METHOD AND MEANS FOR OBLIQUE AERIAL PHOTOGRAPHIC MAPPING
Filed Jan. 6, 1943  3 Sheets-Sheet 3

Inventor
G. W. Rappleyea
By Mason Fenwick & Lawrence
Attorney

Patented Sept. 26, 1944

2,358,777

UNITED STATES PATENT OFFICE 2,358,777

METHOD AND MEANS FOR OBLIQUE AERIAL PHOTOGRAPHIC MAPPING

George W. Rappleyea, New Orleans, La.

Application July 6, 1943, Serial No. 493,648

2 Claims. (Cl. 95—12.5)

Aerial photographic mapping as at present practiced follows generally two known methods, the vertical and the oblique. In the first of these, the camera is fixed to the airplane, pointing perpendicularly to the earth. This method requires trained technicians, elaborate and expensive cameras and special planes with apertures cut in the floor for the mounting of the camera. The focal field is restricted; thousands of photographs must be taken and carefully matched to make a complete map. The plane must maintain a constant elevation and must be absolutely level with each and every picture taken. To cover any appreciable width of territory, the flight must be repeated on closely parallel courses under identical conditions. This is a relatively slow and expensive method, and is necessarily confined to comparatively short flights.

In carrying out the oblique method as practiced up to the advent of the subject invention, the camera is not fixed to the plane; it is held by the photographer pointing forwardly along the course at a constant angle of inclination. The field of view extends over a number of miles so that minutes may elapse between the sequences of exposures. This permits faster and longer flights, the use of less film, and the employment of simpler and less expensive cameras. The plane does not have to be on a level keel when the exposures are made. The focal field is broad so that repeated closely parallel flights are not required.

However, the oblique method has the drawback that the pictures are affected with perspective distortion, so that, as ordinarily practiced, mathematicians must go to work after the pictures are developed and construct a grid on each photograph, based on intricate mathematical computations which include factors peculiar to the flight, such as elevation, direction of course, and inclination of the camera. This naturally takes considerable engineering office work before the information can be transferred to the chart or map under construction.

The present invention relates to a method for oblique aerial photographic mapping which has all of the advantages of the oblique method as heretofore practiced, without the aforementioned drawbacks.

The present invention has for its object the provision of a set of preconstructed grids, made with reference to the particular camera with which they are to be used. They are computed with respect to a certain focal length of lens and a certain constant inclination of the camera. Each grid of a set is especially computed for various convenient elevations such as 2500 feet, 5000 feet, 7500 feet, 10,000 feet, 12,500 feet, 15,000 feet, 20,000 feet. The set of grids furnished for each camera would include one for each of the above elevations. The photographer selects for use the grid corresponding to the elevation at which the plane is to be flown.

The grids are etched, photographed or otherwise depicted upon a rigid transparent planiform plate or sheet, and the camera is provided with a slot substantially at the focal plane of the lens, through which the selected grid is slipped into the camera and positioned adjacent the surface of the film and overlying the same. This grid remains in place while all pictures are taken at that elevation of the aircraft. When it becomes necessary to fly at a different elevation, such height is selected to which one of the other grids corresponds, and the other grid is substituted. Thus, at each exposure a composite picture of the grid and field of view is imposed on the film so that a few minutes after the pictures have been developed, rectangular grids of the same scale can be drawn on the chart and all desired features of the photographs transferred thereto by known methods of plotting.

The camera is further provided with a viewfinder having a horizontal hairline near the top, which is designed to be sighted on the visible horizon while the camera is held by the photographer, at the time of making the exposure, whereby a constant angle of inclination of the camera is determined for all of the pictures.

The subject invention comprehends both the system of oblique aerial mapping employing preconstructed grids, for making composite pictures of the grid and field of view, and the camera with the improvements which adapted it to such use.

In the drawings which accompany and form a part of the following specification, and throughout the several figures of which the same characters of reference have been employed to designate identical parts:

Figure 1:
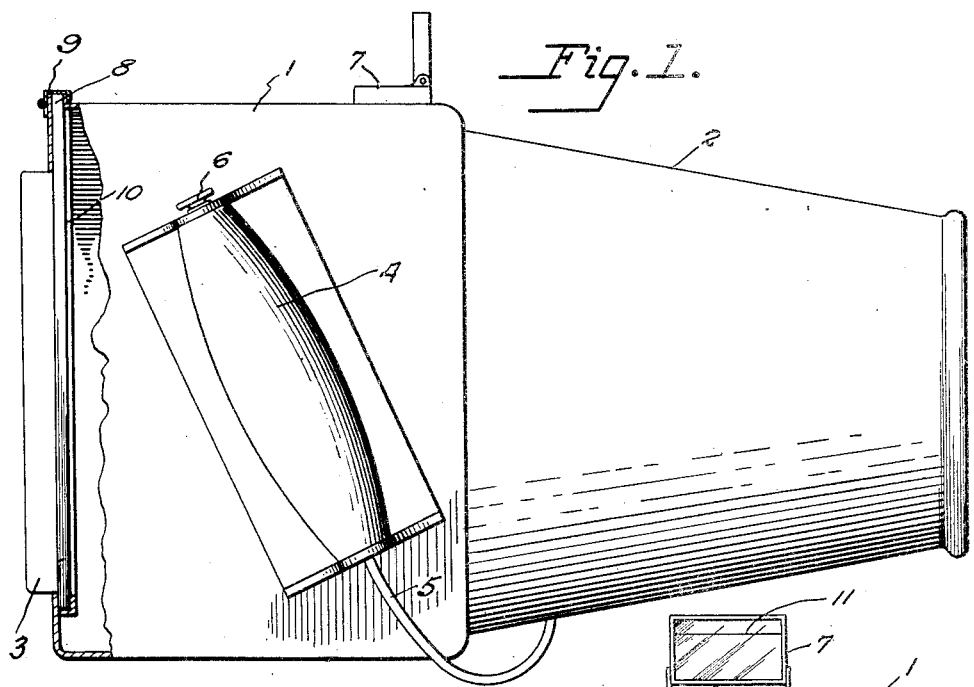
Figure 1 is a side elevation of a camera, partially in section, embodying the features of the subject invention.
Figure 2:
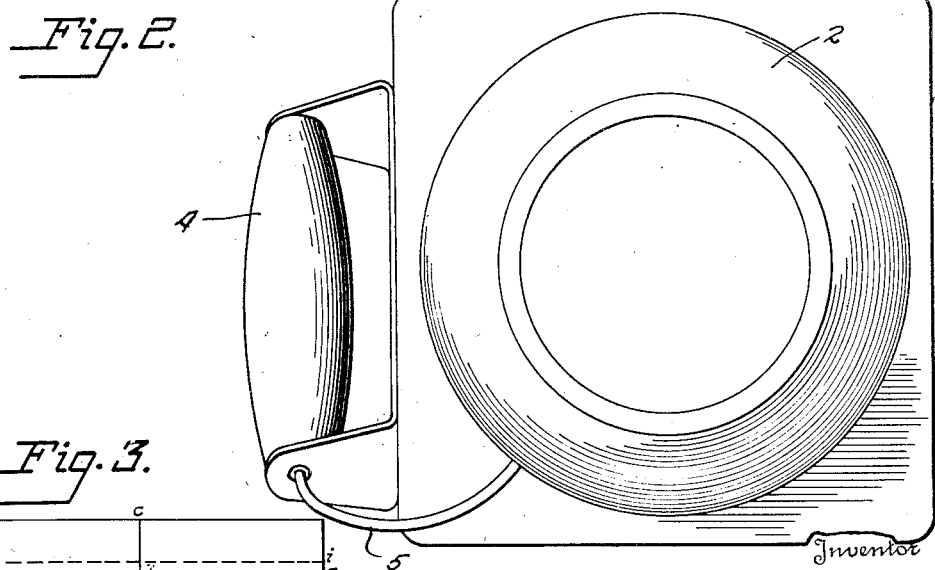
Figure 2 is a front end view.

Referring now in detail to the drawings, and first adverting to the camera shown in Figures 1 and 2, this may be a simple camera 1 of the box type, having the tubular glare shield 2 surrounding the lens, not shown, and the film pack 3 at the rear, with the film substantially in the focal plane of the lens, as is customary in the art. There are side handles secured to opposite sides, one of which is shown at 4. One of said handles may be provided with the cable release 5 to the shutter, and the knob 6 for operating the cable release. The camera may be provided with the view-finder 7. All of the features above mentioned are old in the art, and are merely recited as being typical of conventional types of cameras which are adapted to the use of the subject invention.

That which distinguishes this camera from known cameras is the provision of a slot 8 extending across the top of the camera and closed by a light-tight cover 9, and guides 10 extending from opposite ends of the slot within the camera for guiding a grid inserted in said slot and supporting said grid in front of the film in substantially the focal plane of the camera.

Another feature which distinguishes this camera from conventional cameras, and which is correlated with the employment of the grid is the horizontal hairline 11 extending across the view-finder near the top thereof. When the camera is sighted so as to bring the hairline 11 into coincidence with the visible or apparent horizon, then the camera will be tilted at a certain angle of inclination or depression, which angle is constant for all pictures taken.

Figure 3:
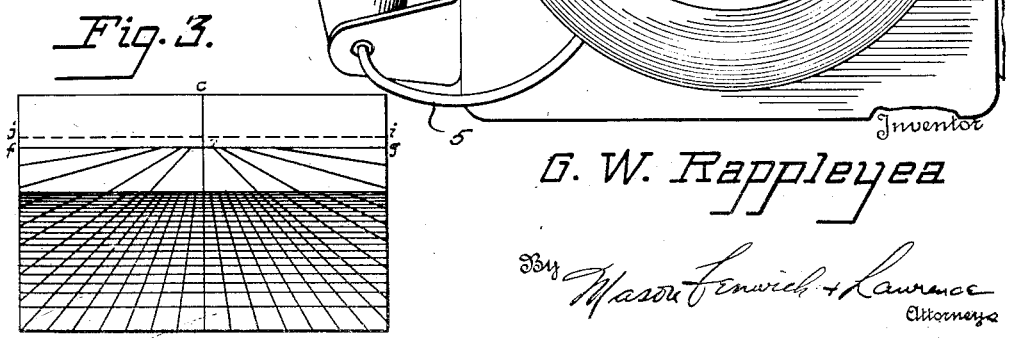
Figure 3 is a front view of one of the preconstructed grids.
Figure 4:
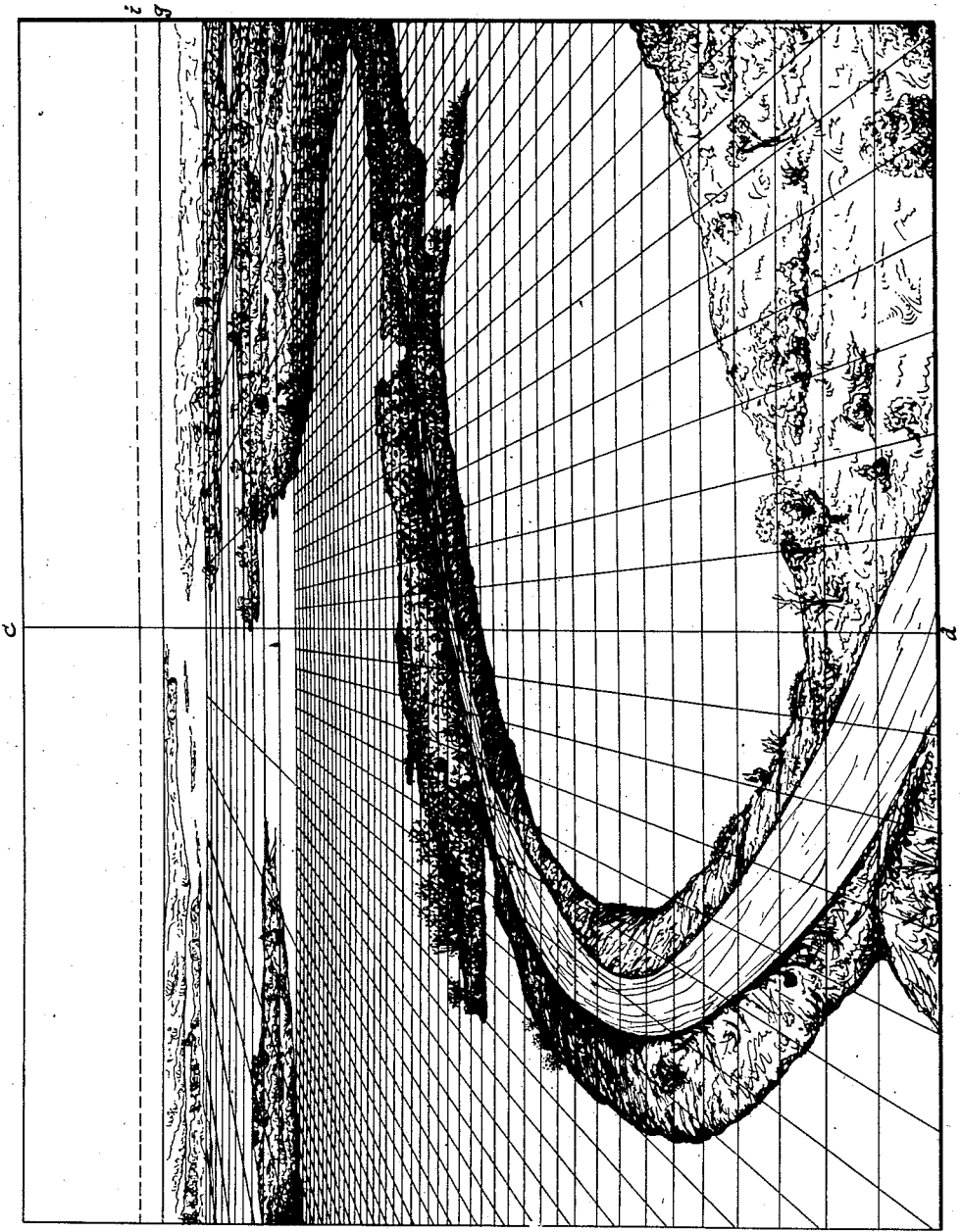
Figure 4 is a front view of a composite picture taken by this camera, showing the photographed grid superposed upon the photographed image of the field of view.

The grid, which is illustrated in Figure 3, is a transparent sheet of any suitable material, on which are delineated a system of lines which when composed with the photograph of the terrain included within the field of view, permits the perspective photograph to be translated into a no-perspective map by the ordinary procedure of plotting.

In constructing a grid, a rectangle is drawn similar to the rectangular shape of the picture, and of the same size as the pictures. The grid may, for the sake of precision, be originally drawn on a much larger scale and then reduced to the size of the picture, but in the interest of simplifying the description, it will be assumed that it is originally drawn to actual size.

The principal parallel $a, b$ is first drawn in. This is a line parallel to the top and bottom margins of the rectangle, and half way between them. Next, the principal meridian $c, d$ is drawn. This is a line parallel to the side margins and half way between them.

The point of intersection $e$, between the principal meridian and principal parallel is the optical center of the grid and is intersected by the focal axis of the lens when the grid is in place in the camera.

The visible or apparent horizon $f, g$ is then drawn. This is parallel to the top of the rectangle and a fixed distance from the top, being the level at which the visible horizon of the image of the field of view appears on the film, determined by sighting the horizontal hairline of the view-finder on the visible horizon.

Figure 5:
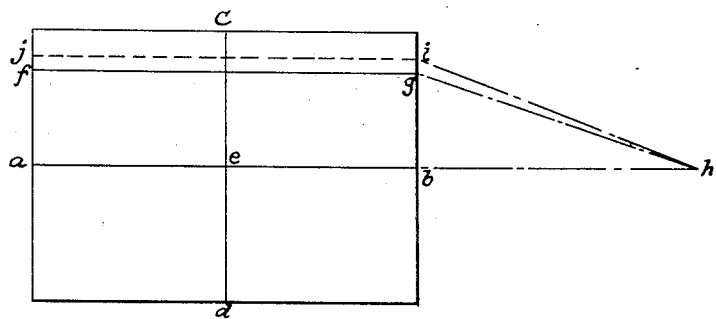
Figures 5, 6 and 7 are diagrammatic views illustrating successive steps in the method of computing the grid.

The principal parallel is then extended to the right of the right margin of the rectangle, as shown in Figure 5, a distance $b, h$ equal to the focal length of the lens. A line is then drawn from the point $h$ to the point $g$ where the apparent horizon intersects the right margin. The angle $bhg$ thus formed, represents the apparent angle of depression. The value of this angle may be determined as follows:

$$\text{Tan angle } bhg = \frac{g, b}{b, h}$$

It now becomes necessary to determine the position of the true horizon line which is always above the apparent horizon. To obtain this position, one must compute the true angle of depression, which is the apparent angle of depression plus a small angle, the value of which depends upon the elevation of the aircraft. This small angle is obtained by multiplying the square root of the height of the aircraft in feet by the constant 58.82, which gives the value of the angle in seconds of arc.

When this small angle has been computed it is laid off with the protractor above the apparent angle of depression and the point $i$ at which it intersects the right margin of the rectangle is a point on the true horizon line. The true horizon line $j, i$ is then drawn parallel to the apparent horizon line $f, g$.

The next computation necessary is to obtain the distance of the front ground line from the true horizon line. This is always located a certain number of inches below the true horizon line. It is, of course, understood that the ground line is directly beneath the aircraft and not in the field of view of the camera. Consequently, it will not appear in the finished grid and on the construction sheet it will be drawn below the grid. The ground line is the line on which one inch equals the desired scale. For example, if it is desired to make the scale of the squares on the chart one inch to a quarter of a nautical mile, then one inch on the ground line represents 1520 feet and each of the four sides of every trapezoid on the grid represents 1520 feet.

The distance in inches of the ground line below the true horizon line is computed by multiplying the height of the plane in feet by the secant of the true angle of depression and dividing the product by the scale in feet to the inch.

Figure 6:
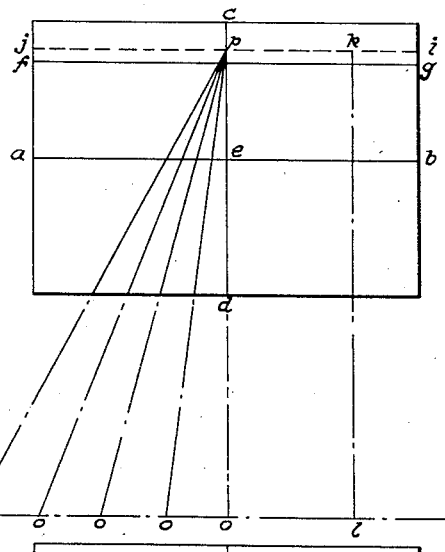

The distance resulting from this computation is represented by the line $k, l$ in Figure 6, and the ground line $m, n$ is drawn parallel to the true horizon line and divided into one inch segments starting with the principal meridian $c, d$ produced, the division points being designated by the letter $o$.

Secondary meridians $o, p$ are now drawn from the points $o$, on the ground line, convergent to the point $p$ where the true horizon line intersects the principal meridian. In this manner, all of the meridians are laid out.

Figure 7:
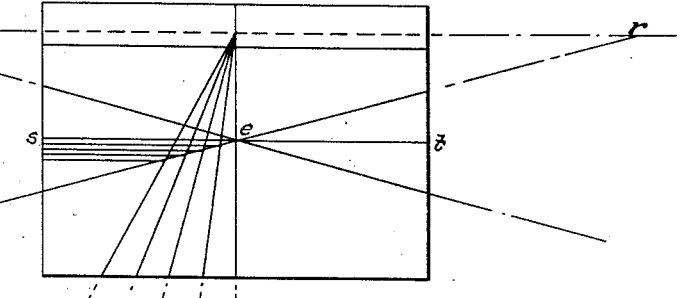

It only remains now to lay out the secondary parallels. This is done by extending the true horizon line to the right and left of the grid rectangle to the diagonal vanishing points. To determine the distance from the principal meridian to the diagonal vanishing points along the line of the true horizon, it is only necessary to multiply the focal length in inches, of the camera lens by the secant of the true depression angle. The vanishing points $q$ and $r$, thus determined, are placed upon the true horizon line, as shown in Figure 7. The diagonals are drawn from these vanishing points through the optical center $e$, which is the intersection of the principal meridian with the principal parallel. Wherever this diagonal line intersects a meridian, a line s, t is drawn parallel to the principal parallel and intersecting the side margins of the rectangle. In this manner, all of the parallels are laid out and the result is a grid of trapezoids to the desired scale.

The grid thus computed is for a certain elevation of the camera above sea level and a number of grids are computed for the same camera, each corresponding to a different arbitrary elevation of the aircraft when the pictures are taken.

These grids are suitably reproduced on permanent transparent sheets sized to fit the camera, and a set, comprising one grid for each elevation is furnished for the camera. These are to be selectively used according to the height of the aircraft. While pictures are being taken at the same height, it is not necessary to change the grid.

The selected grid is slipped into the camera immediately in front of the focal plane of the film, parallel to the same and closely adjacent thereto, so that each exposure is a composite photograph of the grid and the terrain within the field of view, the grid being precisely positioned in that the focal axis of the lens always passes through the focal center of the grid, with the principal parallel of the grid parallel to the base of the photograph.

While I have in the above description disclosed what I believe to be a preferred and practical embodiment of the invention, it will be understood to those skilled in the art that the details of construction and the arrangement of parts are illustrative, and that they do not limit the scope of the invention as defined in the appended claims.

What I claim as my invention is:

1. In a hand camera for oblique aerial photography, a transparent planiform member having thereon a grid consisting of a pattern of trapezoids representing the perspective view through the lens of the camera of an imaginary pattern of squares superposed on the terrain in the field of view at ground level, the sides of which squares in the direction of sight being represented on said grid by lines convergent to a vanishing point in the true horizon, said grid being computed with respect to the height of the camera plane, a constant focal length of the camera lens and a constant tilt of the camera, said grid being positioned substantially in the focal plane between a sensitized surface in said plane and the lens, whereby a composite image of the grid and terrain may be photographed in related perspective, and a sighting device on said camera including a fixed horizontal hairline so positioned as to determine the constant tilt of the camera for which the grid is computed, when the camera is held with said hairline sighted upon the apparent horizon.

2. Method of taking aerial perspective photographs with a hand camera having means for inserting and supporting a grid substantially in the focal plane in front of a sensitized surface, and a sighting device including a fixed horizontal hairline positioned to determine a constant tilt of the camera when said hairline is sighted upon the apparent horizon, comprising providing a series of grids each consisting of a pattern of trapezoids representing the perspective view through the lens of the camera of an imaginary pattern of squares superposed on the terrain in the field of view at ground level, the sides of which squares in the direction of sight being represented on said grids by lines convergent to a vanishing point in the true horizon, said grids being computed for the focal length of the camera lens, a constant angle of tilt, and each for a determined and different height of the camera above ground or sea level, selecting from said series of grids one computed for the height at which the photograph is to be taken, placing it in position in the camera, sighting the hairline on the apparent horizon, and making the exposure, whereby a composite photograph of the selected grid and terrain in the photographic field is produced in correct perspective relation.

GEORGE W. RAPPLEYEA.